(12) United States Patent
Mango, Jr. et al.

(10) Patent No.: US 8,076,577 B2
(45) Date of Patent: Dec. 13, 2011

(54) TWO-GANG ADJUSTABLE MUD RING

(75) Inventors: Joey D. Mango, Jr., Cordova, TN (US); Andrew C. Cole, Memphis, TN (US); James Michael Baker, Southaven, MS (US)

(73) Assignee: Thomas & Betts International, Inc., Wilmington, DE (US)

( * ) Notice: Subject to any disclaimer, the term of this patent is extended or adjusted under 35 U.S.C. 154(b) by 477 days.

(21) Appl. No.: 12/401,729

(22) Filed: Mar. 11, 2009

(65) Prior Publication Data
US 2009/0166053 A1   Jul. 2, 2009

Related U.S. Application Data

(63) Continuation-in-part of application No. 12/046,586, filed on Mar. 12, 2008, now Pat. No. 7,645,936.

(60) Provisional application No. 60/906,752, filed on Mar. 13, 2007.

(51) Int. Cl.
*H01H 9/02* (2006.01)

(52) U.S. Cl. ............... 174/53; 174/57; 174/58; 174/66; 220/3.2; 220/3.3; 220/241

(58) Field of Classification Search .............. 174/480, 174/481, 50, 53, 57, 58, 66, 67, 135; 220/3.2–3.9, 220/4.02, 241, 242; 33/528, DIG. 10
See application file for complete search history.

(56) References Cited

U.S. PATENT DOCUMENTS

| 2,378,861 | A  | * | 6/1945  | Peevey ............................ | 220/3.7 |
| 2,989,206 | A  | * | 6/1961  | McAfee .......................... | 220/3.7 |
| 4,634,015 | A  | * | 1/1987  | Taylor ............................ | 220/3.7 |
| 4,927,039 | A  | * | 5/1990  | McNab ........................... | 174/57 |
| 5,931,325 | A  | * | 8/1999  | Filipov ........................... | 174/57 |
| 6,820,760 | B2 | * | 11/2004 | Wegner et al. .................. | 174/57 |
| 6,875,922 | B1 | * | 4/2005  | Petak et al. ..................... | 174/58 |
| 7,276,661 | B2 | * | 10/2007 | Wegner et al. .................. | 174/58 |
| 7,301,099 | B1 | * | 11/2007 | Korcz ............................. | 174/58 |
| 7,410,072 | B2 | * | 8/2008  | Wegner et al. .................. | 174/58 |
| 7,495,170 | B2 | * | 2/2009  | Dinh et al. ...................... | 174/58 |
| 7,531,743 | B2 | * | 5/2009  | Johnson et al. ................. | 174/58 |
| 7,645,936 | B2 | * | 1/2010  | Magno, Jr. ...................... | 174/53 |

* cited by examiner

*Primary Examiner* — Angel R Estrada
(74) *Attorney, Agent, or Firm* — Hoffmann & Baron, LLP

(57) ABSTRACT

This invention pertains to an adjustable cover for an electrical outlet box. The cover is configured having a generally planar mounting plate with a collar surrounding an opening through this mounting plate. An extension sleeve moves within this opening and adjacent the collar. At least one fastener is located adjacent the opening and is movable between a locked position and an unlocked position. The fastener operates a locking device that engages wedges against the extension sleeve when the fastener is in the locked position and disengages wedges against the extension sleeve when the fastener is in the unlocked position.

20 Claims, 3 Drawing Sheets

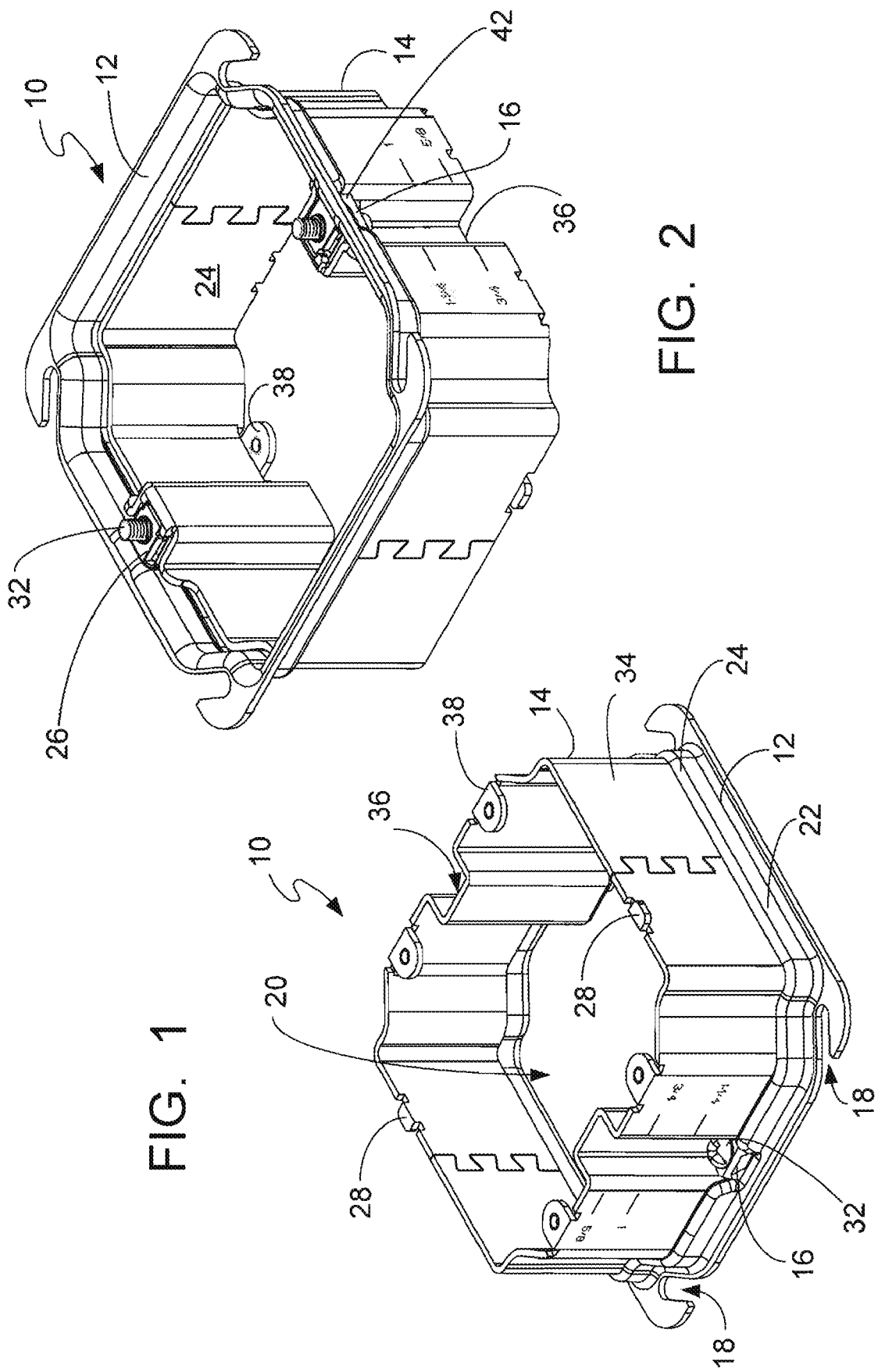

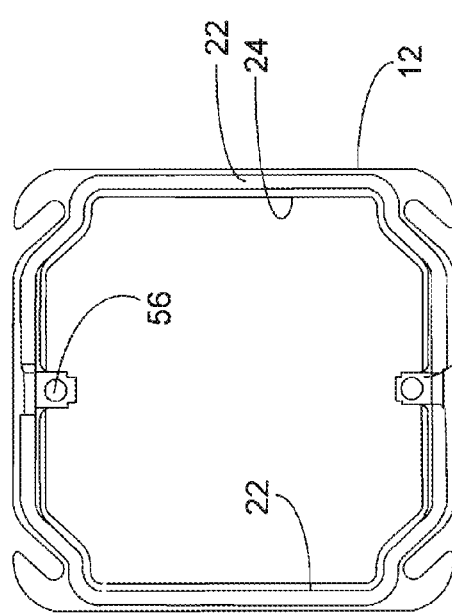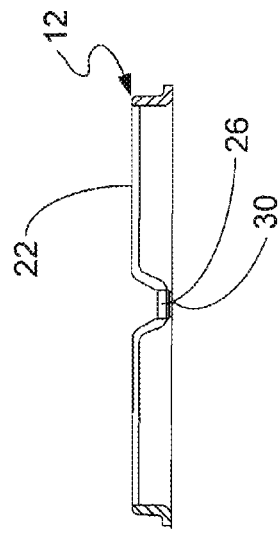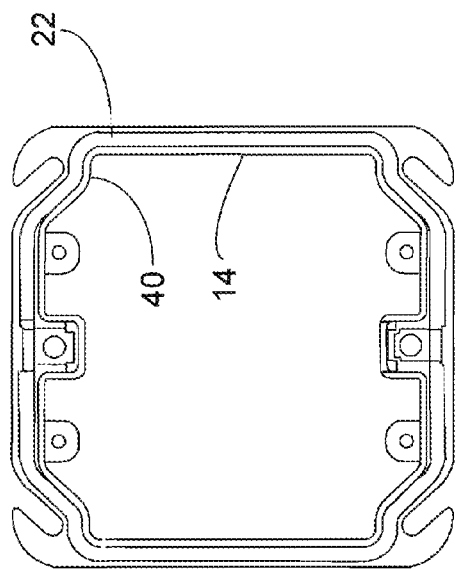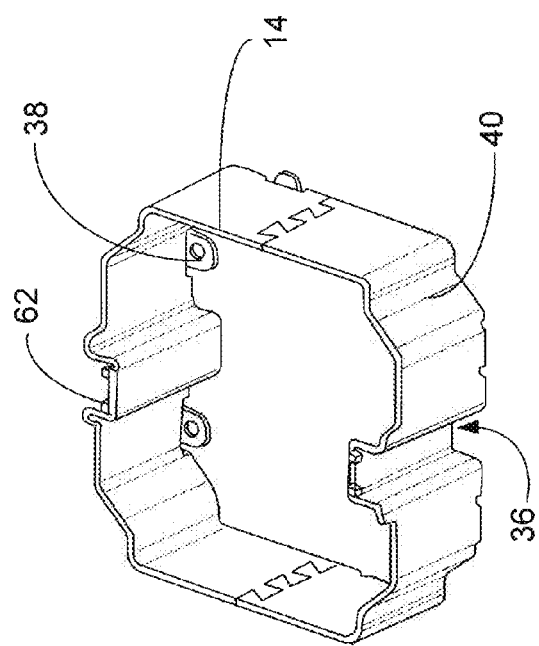

TWO-GANG ADJUSTABLE MUD RING

CROSS-REFERENCE TO RELATED APPLICATION

This application claims priority to U.S. Provisional Patent Application No. 60/906,752 filed on Mar. 13, 2007, and is a continuation in part of U.S. application Ser. No. 12/046,586 filed on Mar. 12, 2008, now U.S. Pat. No. 7,645,936 all of which are incorporated herein by reference.

FIELD OF THE INVENTION

This invention pertains to a cover of an electrical outlet box and more particularly to a cover having an adjustable extension sleeve attached thereto.

BACKGROUND OF THE INVENTION

Daring construction, electrical outlet boxes are affixed to their support or stud prior to the wall covering (i.e. dry wall) being installed. It is generally known what thickness of dry wail is going to be installed and hence electrical outlet boxes are installed off-set from the front of the stud by that amount so as to be flush with the wall. However, if the dry wall thickness is not known or if it changes or if additional wall material (i.e. tile, sound insulation, double-layer dry wall) is subsequently added, then the box opening will no longer be flush with the wall and hence it will be difficult, if not impossible, to properly install an electrical device within the box.

Solutions to this problem are varied. U.S. Pat. No. 5,253,831 discloses a bracket that is rigidly affixed to the stud. A box is then adjustably secured to the bracket. Thus, if the wall material is greater or less than expected, the entire box can be adjusted accordingly. Unfortunately, if the code specifies that all wiring to/from the box be contained in conduit, this would mean that the conduit would also have to move along with the box which is not always possible.

U.S. Pat. No. 4,927,039 discloses a removable attachment that abuts the open perimeter of the box. A first (cut-out) wall covering is applied over the box before the attachment is secured against the open front face of the box. Then a second wall covering is installed. Thus, this attachment is configured to accommodate both, wall thicknesses, but such thicknesses must be known beforehand so that the proper sized attachment can be ordered. If there is any subsequent change, this attachment cannot be subsequently altered.

A further variation is shown in U.S. Pat. No. 2,378,861 and U.S. Pat. No. 4,634,015. In both of these cases, an extension sleeve is mounted to either the box itself or to the box's cover. The extension sleeve is threadably mounted such that it can be adjusted as needed even after the wall material is installed. In both cases, however, the user must make the adjustments from inside the box which exposes the installer to the oftentimes live wires contained therein. Also, in both cases, long screws are needed as they must be at least as long as the adjustment range of the extension sleeve. Such screws also project well into the box and can interfere with the box's wiring. Further, in both cases, the ground path from the electric device to the box passes through the screw; hence if the screw is loose or the mating threads are not properly sized, grounding issues can surface. Finally, in both cases, the screw is used to position the extension sleeve and hence the extension sleeve can never be rigidly locked into any one position.

It is thus an object of this invention to provide a cover that is inexpensive to manufacture and yet is infinitely adjustable. A further object of this invention is to provide a cover whose adjustable extension sleeve provides a solid ground path for the electric device and which can be easily locked or fixed at a selected position as desired. Still a further object of this invention is to eliminate the need for long screws that can interfere with the box's wiring and to also eliminate the need for the installer to make adjustments from within the box. Yet another object of this invention is to provide a means where adjustments to the box can be made without adjusting the position of the box itself. It is a further object of this invention to provide a means of making adjustments even if the wall thickness varies or if later a new wall covering is applied. These and other objects and advantages of this invention will be come apparent upon further investigation and review.

SUMMARY OF THE INVENTION

This invention pertains to an adjustable cover that is mounted to an electrical outlet box. The cover incorporates a mounting plate that extends over a portion of the electrical outlet box. This cover includes a collar that surrounds an opening with this collar having a distal end spaced from the mounting plate. An extension sleeve fits within this collar and moves with respect thereto. Adjacent the opening is at least one fastener, this fastener being movable between a locking position and an unlocking position. The fastener operates at least one locking device to selectively cause such device to engage or disengage the extension sleeve in order to selectively lock or unlock the extension sleeve with respect to the mounting plate. The at least one locking device includes a pair of L-shaped wedges.

Further provided is an adjustable cover for an electrical outlet box including a mounting plate, an extension sleeve and two locking devices. The mounting plate has an inner rim, the inner rim defines an opening, the inner rim includes two opposing tabs on opposite sides of the inner rim and protruding into the opening. The extension sleeve extends adjacent to the inner rim and the opening, the extension sleeve extending generally perpendicular to the mounting plate, the extension sleeve being freely movable within the inner rim. Two locking devices, each device including a fastener and a pair of L-shaped wedges, each fastener extending through each of the pair of L-shaped wedges and one of the two tabs. The locking devices configured to selectively engage and disengage the extension sleeve so as to selectively lock and unlock the extension sleeve with respect to the mounting plate.

BRIEF DESCRIPTION OF THE DRAWINGS

FIG. 1 is a top perspective view of the box cover of the present invention.

FIG. 2 is a bottom view of the cover of FIG. 1.

FIG. 3 is a top view of the box cover of FIG. 1.

FIG. 4 is bottom perspective view of the extension sleeve of the present invention.

FIG. 5 is a top perspective view of the mounting plate of the present invention.

FIG. 6 is a cross-sectional view of the mounting plate of FIG. 5 along A-A.

DETAILED DESCRIPTION OF THE PREFERRED EMBODIMENT

Figure 8:
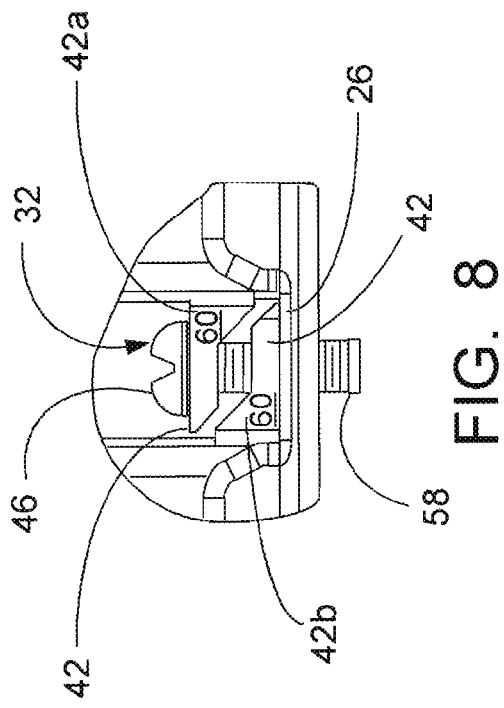
FIG. 8 is an enlarged side perspective view of a portion of the mounting plate and wedge of FIG. 7.

Referring to FIGS. 1-10 there is shown an adjustable device cover 10 of the present invention including a mounting plate 12, an extension sleeve 14 and a locking device 16. This assembly includes a generally rectangular base or mounting plate 12 that is used to secure device cover 10 to an electrical outlet box (not shown) and preferably a two or more gang box such as a 4 inch square or a 4 11/16 inch square box. A series of slots or apertures 18 are spaced along the perimeter of plate 12 through which one or more fasteners would extend so as to mount cover 10 to the outlet box in the convention fashion. These slots 18 are preferably arranged so that mounting plate 12 can be secured to the box in a variety of different orientations.

Figure 7:
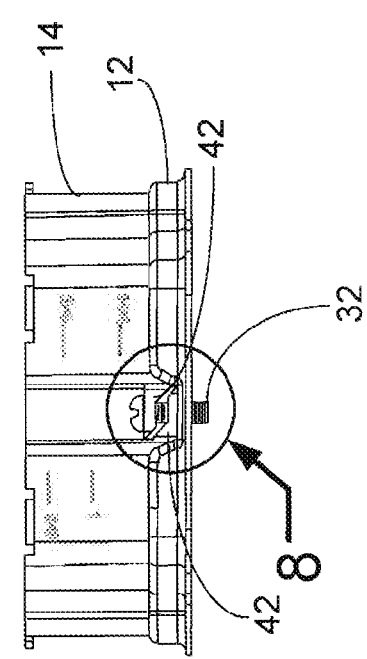
FIG. 7 is a side perspective view of the mounting plate of FIG. 1.

The center of cover 10 contains a large opening 20 that permits access through cover 10 to the interior of the electrical outlet box. Surrounding and generally defining opening 20 is collar 22 which projects away from and generally perpendicular to mounting plate 12. FIGS. 1, 5 and 6 show the upper distal end 24 of collar 22 is generally rounded, being curved towards opening 20. FIGS. 6 and 7 show tab 26 is recessed or inset from the collar 22. The collar 22 includes at least one inwardly facing tab 26. The tab 26 projects inwardly toward the opening 20. FIGS. 1-3 and 5 show two opposing tabs 26. The tabs 26 include aperture 56 used for locking the extension sleeve 14 to the mounting plate 12. Tab 26 includes an interior threaded portion 30 which mates with the exterior threading of fastener 32 to lock the fastener in place.

FIGS. 1-3 show slidably positioned within collar 22 is extension sleeve 14. Extension sleeve 14 is generally an open box-like structure having sidewalls 34 corresponding with opening 16. The depth of sidewalls 34 is approximately the amount of adjustment provided by cover 10, hence such depth can be varied by the manufacturer as needed. Extension sleeve 14 contains device mounting tabs 38 which are used to secure an electric device (not shown) to cover 10. The sidewall(s) 34 which would run adjacent to tab(s) 26 of the collar 22 include a concaved portion or a channel 36 that closely conforms to tab 26 and which protrudes into the opening 20. The tab 26 travels through the channel 36 until the preferred position is obtained and the extension sleeve 14 is secured in position accordingly. Also, if desired, extension sleeve 14 can be configured with upper stops and/or lower stops 28 that prevent extension sleeve 14 from sliding out of mounting plate 12. Such stops 28 can consist primarily of small projections that engage distal end 24 of collar 22 but cannot pass through opening 20.

FIG. 3 shows the opposite corners 40 of extension sleeve 14 are beveled or angled inwardly into opening 20. While this bevel is shown as being slightly curved into the opening 20, other configurations are possible if desired such as to accommodate both the electrical device mounted to tabs 38 as well as the mounting screws passing through slots 18. It is also possible that the four corners 40 of extension sleeve 14 are regular 90 degree corners. In some cases, protruding stops are located at one or more such corners 40 which help prevent extension sleeve 14 from sliding out of collar 22. However, these stops are not required for the operation of cover 10.

FIG. 7 shows details of the locking device 16 which includes a fastener 32 and a pair of wedges 42. The short fastener 32 passes through wedge apertures 44 and proceeds into the inward tab 26 through aperture 56. These fasteners 32 are adjustable between a locking position and an unlocking position to allow for adjustment of the collar 22 along the extension sleeve 14 and securement of the collar 22 at the desired position along the extension sleeve 14.

FIGS. 7 and 8 show the pair of wedges 42 including identical wedges 42 where one wedge 42a is positioned on top of the other wedge 42b. The top wedge 42a is positioned upside down and rotated 180° from, the position of the bottom wedge 42b as shown in FIG. 8. This position allows wedge 42a to seat on top of wedge 42b and as the head 46 of the fastener 32 draws the wedges 42a, 42b together against the tab 26 the wedges 42a, 42b are forced outwardly against the wall of the channel 36.

Figure 10:
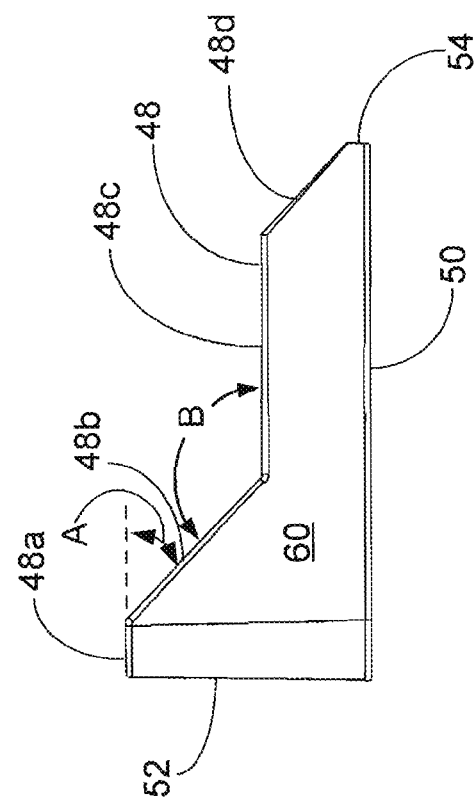
FIG. 10 is a side planar view of wedge of FIG. 9.
Figure 9:
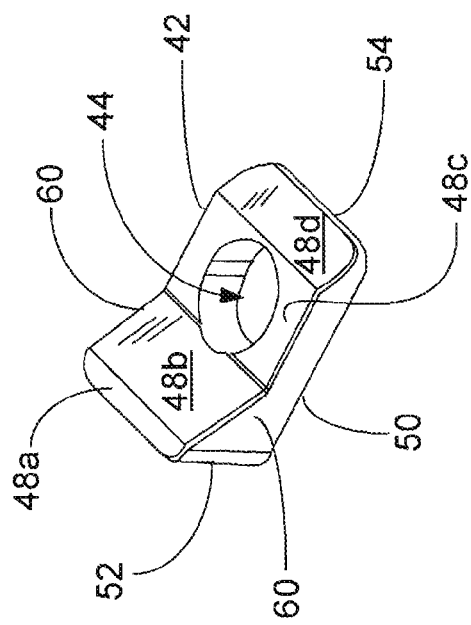
FIG. 9 is a top perspective view of wedge of FIG. 1.

FIGS. 9 and 10 show wedge 42 has a generally L-shaped geometry that will flex outwardly to meet and mate with the walls of the channel 36. Each wedge 42 includes two parallel L-shaped surfaces 60, an upper surface 48, a lower surface 50, two side surfaces 52, 54 and material therebetween. The bottom surface 50 is a planar surface. The upper surface 48 extends between the L-shaped surfaces 60. The upper surface 48 includes two planar surfaces 48a and 48c which are parallel to the bottom surface 50, Planar surface 48a is shorter than planar surface 48c. Shorter planar surface 48a is spaced apart from longer planar surface 48e. Angled surface 48b connects planar surface 48a to a longer planar surface 48c. Angled surface 48b sloped downwardly from shorter surface 48a at angle A which is less than 90°. Angled surface 48b similarly extends from longer planar surface 48c upwardly toward shorter surface 48a at angle B which is an obtuse angle greater than 90°, preferably about 135°. Wedge aperture 44 extends through longer planar surface 48c through the wedge and bottom surface 50. Additionally, the aperture 44 cuts through a portion of angled surface 48b. Extending from longer planar surface 48c is shorter angled surface 48d, Shorter angled surface 48d extends between long planar surface 48c and side surface 54. Shorter angled surface 48d is preferably shorter than angled surface 48b. Shorter angled surface 48d is preferably parallel to angled surface 48b. Side surfaces 52 and 54 extend generally perpendicularly from lower surface 50.

FIGS. 1, 2, 7 and 8 show wedges 42 are sized so that while they are loosely restrained by fastener 32 in the unlocked position collar 22 is allowed to move freely about sleeve 14. The fastener 32 extends through the wedges 42 and then through the aperture 56 of the tab 26 in the mounting plate 12. Fastener 32 includes a head 46 at one end, a stop 58 at the other end and a threaded portion therebetween in which the wedges 42 mate with the fastener 32. Stop 58 is larger than aperture 56 of the tab 26 such that the fastener 32 is retained within aperture 56. Stop 58 and the head 46 prevent the fastener 32 from being removed from the collar and/or the wedges 42. In this configuration, the wedges 42 are sandwiched between the collar 22 and fastener head 46. Once collar 22 is properly positioned along extension sleeve 14 then subsequent tightening of fastener 32 drives the fastener 32 downward along the threading of the aperture 56. As the head of the fastener 46 nears tab 26 the wedges 42 are being compressed therebetween, and the wedges 42 is reversibly deformed outwardly against the wail of the channel 36. This outward expansion of the wedges 42 are forced or biased against the channel 36 to hold collar 22 in place. Such force as applied by wedges 42 will bind or lock extension sleeve 14 within collar 22. To release the wedges 42, one need only rotate the fastener 32 so as to allow the wedges 42 to return to their original shaped configuration.

Having described the preferred embodiments herein, it should now be appreciated that variations may be made thereto without departing from the contemplated scope of the invention. Accordingly, the preferred embodiments described herein are deemed illustrative rather than limiting, the true scope of the invention being set forth in the claims appended hereto.

What is claimed is:

1. An adjustable cover for an electrical outlet box comprising:

(a) a mounting plate having a collar surrounding an opening, said collar having a distal end region remote from said mounting plate, said distal end region including at east one tab protruding into said opening;
(b) an extension sleeve sized to move within said opening adjacent said distal end of said collar;
(c) at least one fastener extending through said tab and movable between a locking and an unlocking position; and
(d) least one locking device operable by said fastener, each of said at least one locking device includes a pair of L-shaped wedges configured to selectively engage and disengage said extension sleeve so as to selectively lock and unlock said extension sleeve with respect to said mounting plate.

2. The adjustable cover as set forth in claim 1 wherein a first said fastener and a first of said at least one locking device is located through a first said tab, and a second said fastener and a second of said at least one locking device is located through an opposing tab.

3. The adjustable cover as set forth in claim 1 wherein said fastener extends through said wedge.

4. The adjustable cover as set forth in claim 3 wherein said at least one tab includes an interior threaded aperture.

5. The adjustable cover as set forth in claim 4 wherein said wedge is sandwiched between said at least one tab and a head of said fastener.

6. The adjustable cover as set forth in claim 5 wherein said extension sleeve is configured with mating surfaces for engagement thereof by said wedge.

7. The adjustable cover as set forth in claim 6 wherein said configuration is a concaved channel extending along a sidewall of said extension sleeve.

8. The adjustable cover as set forth in claim 1 wherein said pair of wedges are identical and seat upon each other.

9. The adjustable cover as set forth in claim 8 wherein said each of said wedges includes an upper surface extending between two L-shaped surfaces, each of said upper surfaces are in contact with each other.

10. The adjustable cover as set forth in claim 9 wherein said upper surface includes a pair of parallel planar surfaces connected to each other by a first angled surface.

11. The adjustable cover as set forth in claim 10 wherein said wherein said upper surface includes a second angled surface.

12. The adjustable cover as set forth in claim 11 wherein said second angled surface is smaller than said first angled surface.

13. The adjustable cover as set forth in claim 12 wherein one of said pair of planar surfaces is smaller than another of said pair of planar surfaces.

14. The adjustable cover as set forth in claim 13 wherein said first angled surface is parallel to said second angled surface.

15. The adjustable cover as set forth in claim 1 wherein said fastener includes an end which is larger than an aperture in said tab to prevent said fastener from being removable from said aperture.

16. An adjustable cover for an electrical outlet box comprising:
(a) a mounting plate having an inner rim, said inner rim defining an opening, said inner rim including two opposing tabs on opposite sides of said inner rim and protruding into said opening;
(b) an extension sleeve extending adjacent to said inner rim and said opening, said extension sleeve extending generally perpendicular to said mounting plate, said extension sleeve being freely movable within said inner rim;
(c) two locking devices, each device including a fastener and a pair of L-shaped wedges, each fastener extending through each of said pair of L-shaped wedges and one of said two tabs, said locking devices configured to selectively engage and disengage said extension sleeve so as to selectively lock and unlock said extension sleeve with respect to said mounting plate.

17. The adjustable cover as set forth in claim 16 wherein each of said pair of wedges is sandwiched between said mounting plate and a head of said fastener.

18. The adjustable cover as set forth in claim 17 wherein said extension sleeve is configured with mating surfaces for engagement thereof by said pair of wedges.

19. The adjustable cover as set forth in claim 16 wherein said each of said wedges includes an upper surface extending between two L-shaped surfaces, each of said upper surfaces are in contact with each other.

20. The adjustable cover as set forth in claim 19 wherein said upper surface includes a pair of parallel planar surfaces connected to each other by a first angled surface.

* * * * *